F. DONEY.
INSECT EXTERMINATOR.
APPLICATION FILED DEC. 18, 1912.
1,073,029. Patented Sept. 9, 1913.
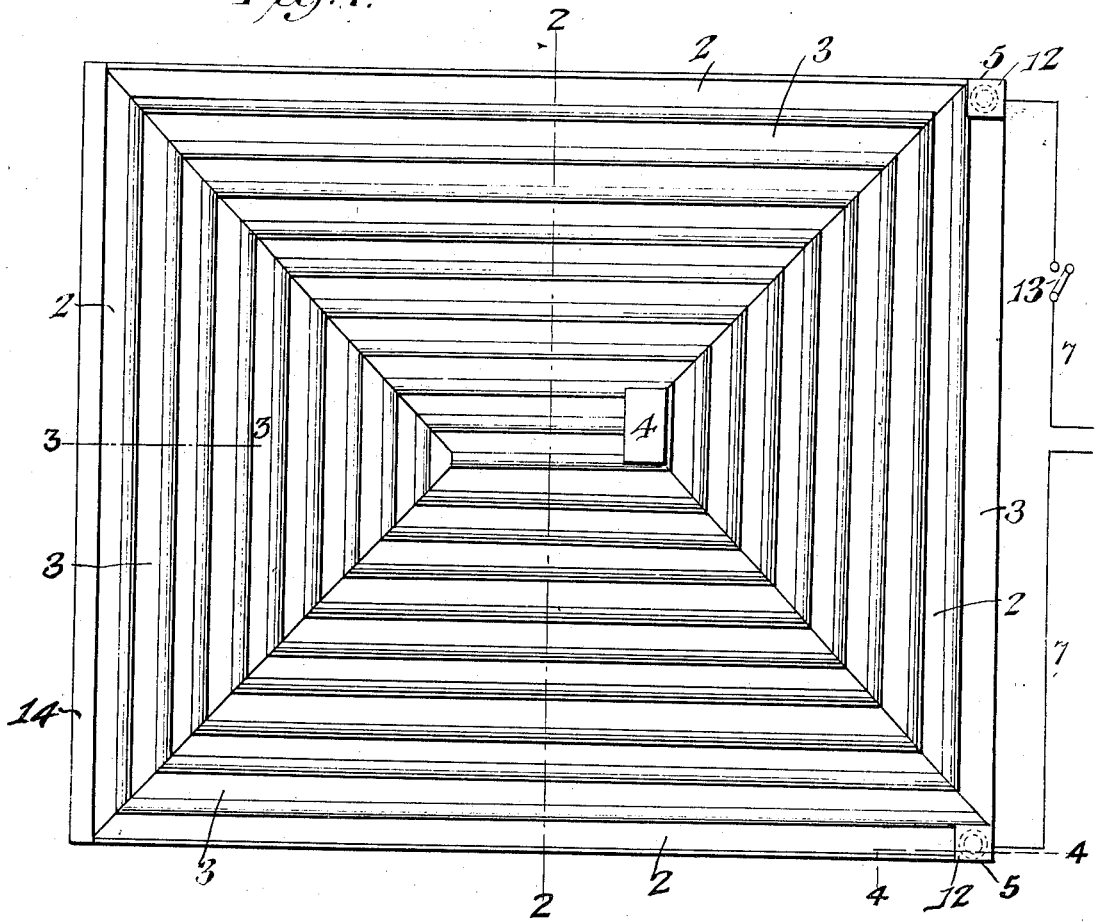
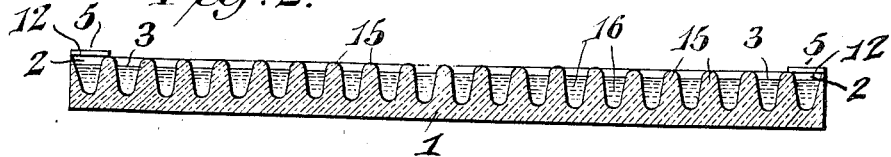
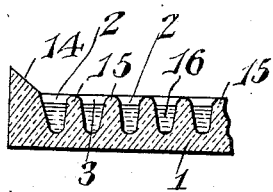
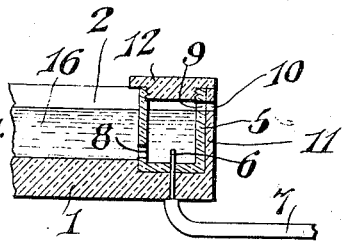
WITNESSES
Frank Doney, INVENTOR
BY
ATTORNEY

UNITED STATES PATENT OFFICE.

FRANK DONEY, OF COLFAX, WASHINGTON, ASSIGNOR OF ONE-HALF TO WILLIAM T. SMITH, OF COLFAX, WASHINGTON.

INSECT-EXTERMINATOR.

1,073,029. Specification of Letters Patent. Patented Sept. 9, 1913.

Application filed December 18, 1912. Serial No. 737,444.

*To all whom it may concern:*

Be it known that I, FRANK DONEY, a citizen of the United States, residing at Colfax, in the county of Whitman and State of Washington, have invented a new and useful Insect-Exterminator, of which the following is a specification.

This invention has reference to improvements in insect exterminators, and is designed more particularly for the destruction of insects by electrocution.

In accordance with the present invention there is provided a receptacle having ledges to which an insect may find access and such ledges are particularly accessible to the insects commonly known as flies. Because of the special adaptability of the device for the destruction of flies it will be considered throughout the following description as a fly trap or exterminator, without, however, limiting it to such use.

In accordance with the present invention two elongated channels are provided side by side, but while only separated by comparatively narrow division walls or strips, the two channels are out of communication throughout their length and at appropriate ends these channels, which are designed to contain sweetened water or other similar material attractive to flies, have means designed to operate as terminals of a circuit which when properly connected up to a source of electric energy will cause the charging or electrification of the water or the like contained in the channels in a manner to produce an appropriate difference of potential between the bodies of water in adjacent channels. The division walls are made quite narrow and more or less precipitous, so that a fly alighting on a division wall and attempting to reach the water in one of the channels is liable, and in fact almost certain, to touch the water in the next adjacent channel, whereupon the body of the fly completes the electric circuit and the current being properly proportioned for the purpose, the fly receives a killing shock being thus automatically electrocuted, but as there is no communication between the water channels connected to the opposite sides of the circuit except by way of the bodies of the flies, the amount of current which is required to keep the apparatus in working order is negligible, and should it transpire that the body of the killed fly so falls as to bridge the space between two adjacent channels, even then the amount of current which would traverse the body of a fly would either be exceedingly small or would become destructive to the body of the fly and thereby quickly removing it as a bridging connection between the water channels.

The invention will be best understood from a consideration of the following detailed description taken in connection with the accompanying drawings forming a part of this specification, with the further understanding that while the drawings show a practical form of the invention the latter is not confined to any strict conformity with the showing of the drawings, but may be changed and modified so long as such changes and modifications mark no material departure from the salient features of the invention.

In the drawings:—Figure 1 is a plan view of a fly trap constructed in accordance with the present invention. Fig. 2 is a section on the line 2—2 of Fig. 1. Fig. 3 is a fragmentary section on the line 3—3 of Fig. 1. Fig. 4 is a fragmentary section on the line 4—4 of Fig. 1.

In the drawings there is shown a plate 1 which when water is used as an electrolyte should be flat, so as to rest in a substantially horizontal position upon a level surface, although any suitable support may be employed. In the particular structure shown the plate 1 is of rectangular outline, but may as well be circular or oval or any other suitable shape for the particular outline of the plate is immaterial to the function of the device.

The plate 1 may be made of glass, glazed porcelain or other suitable material preferably insulating in its nature, and in what may be termed the upper face of the plate 1, since in operation it is presented upwardly, there are produced grooves or channels 2, 3, respectively. The channels may be considered as beginning at the corners of the plate, if it be that it is rectangular, at opposite ends of the same side of the plate, and these channels or grooves are continued about the plate side by side and gradually approaching the center of the plate, so that practically the whole surface of the plate is taken up by the grooves, and the inner ends of the grooves may be defined by a block 4 seated in the body of the plate or otherwise. At the outer end of each groove a cup 5 is lodged in the plate, and this cup is entered by the terminal portion 6 of a conductor 7. Formed through one wall of the cup is a passage 8, which, when the cup is seated in the plate, coincides substantially with the bottom of a groove 2 or 3 as the case may be. Through the opposite wall of the cup is a passage 9 to determine the level to which liquid will rise in the grooves 2 or 3, as the case may be, and this passage 9 may discharge directly outside of the plate or through a coinciding passage 10 in an exterior wall 11 at the end of the respective groove. The cup 5, which is formed of some suitable insulating material, is provided with a cap 12 which will prevent accidental contact with the terminal 6 of the conductor 7. In one conductor 7, there being two such conductors, there may be introduced a switch 13 so that the device may be placed in circuit with a suitable source of electric energy, or cut off therefrom at the will of an operator. The electric source is not indicated in the drawings, since such source is not a part of the present invention and may either be street electric service or a battery or any other suitable source of current.

It is desirable that the edge or side of the plate 1 remote from the cups 5 be carried up somewhat higher than the rest of the plate and slanted toward the central portion of the plate, as indicated at 14, so as to facilitate the removal of dead flies by brushing them toward such edge of the plate, this being accomplished without materially disturbing the liquid which may be lodged in the grooves 2 and 3.

When it is desired to set the device in operation, water is poured anywhere upon the plate and rapidly finds its way through the channels 2 and 3, which latter are separated by intermediate walls 15 and as the water seeks its level it will flow into the cups 5 through the openings 8 until it overflows through the openings 9, whereby the water may be brought to the same level throughout the channels 2 and 3. By sweetening the water, indicated at 16 in Figs. 2, 3 and 4, it is made attractive to flies, which finding a place on the exposed edges of the walls 15 which may project, say, about one-sixteenth of an inch above the level of the water, will endeavor to drink the sweetened water and the narrowness of the exposed edges of the walls 15 will in practically all cases cause the flies to touch the water in the channels on opposite sides of the particular ledge upon which they alight. Assuming that the switch 13 is closed, the electric charge in the conductors 7 extends into the water throughout the channels 2 and 3, but since these channels are separate and without communication, there is simply established in the adjacent channels a difference of electric potential agreeable to that in the circuit of which the conductors 7 form a part, but there is no waste of energy since the circuit is incomplete or open at said channels. When, however, a fly shall simultaneously touch the water in adjacent channels on opposite sides of the ledge upon which the fly is standing, the circuit is completed and the electric current traversing the body of the fly is ample to instantly kill the insect which under the shock caused by the passage of the current will in most instances fall into a channel between two walls 15, thereby breaking the circuit and preventing any further flow of current. Should, however, the body of the fly fall in such a manner as to still maintain the continuity of the circuit, the flow of current which would pass through the body of the fly without destroying it would be so small as to be negligible, but it takes but little current to cause the destruction of the body of the fly by heat generated by the passage of the current, wherefore the arrangement may be such that the flies are not only electrocuted automatically, but where the bodies of the flies may remain in circuit closing position they are quickly destroyed. When there is an accumulation of dead flies in the channels, they are readily removed by brushing them toward the edge 14 over which the bodies of the flies are readily pushed, and may be collected and carried away to some place of disposal.

The grooves 2 and 3 may be so narrow that it is practically impossible for a person to contact with the water therein to receive a shock from the electric charge established in the device, but a fly will find ready access to the surface of the water.

What is claimed is:—

1. An electric insect destroying device comprising a receptacle having closely adjacent open channels for containing a liquid, and means for connecting liquid within the channels to a source of electric energy for charging said liquid.

2. A device for destroying insects by an electric current comprising a liquid holder having distinct open channels separated by relatively thin walls rising above the liquid level in the channels, and means for connecting liquid when in the channels with a source of electric current to produce a difference of electric potential in the channels on opposite sides of a division or separating wall.

3. A device for destroying insects comprising a plate of insulating material having produced in one face a pair of closely adjacent channels in interwound relation with a relatively narrow division wall between the channels, means for establishing a predetermined level of liquid within the channels, and means for charging liquid when within the channels with electric potential whereby the liquid in one channel is of a different potential from that in the next adjacent channel.

4. A device for destroying insects comprising a plate of insulating material having a pair of channels formed in one piece in interwound relation with a narrow separating wall, each channel being electrically insulated from the other, and a cup at one end of each channel having an electric terminal therein, each cup being provided with a passage communicating with a respective channel and another passage constituting an overflow passage to determine the depth of a liquid introduced into the channel.

5. A device for destroying insects comprising a plate of insulating material having a pair of channels formed in one face in interwound relation with a narrow separating wall, each channel being electrically insulated from the other, and a cup at one end of each channel having an electric terminal therein, each cup being provided with a passage communicating with a respective channel and another passage constituting an overflow passage to determine the depth of a liquid introduced into the channel, and each cup having a cover member for protecting the electric terminal within the channel.

6. A device for destroying insects comprising a plate of insulating material having a pair of channels formed in one face in interwound relation with a narrow separating wall, each channel being electrically insulated from the other, and a cup at one end of each channel having an electric terminal therein, each cup being provided with a passage communicating with a respective channel and another passage constituting an overflow passage to determine the depth of a liquid introduced into the channel, and each cup having a cover member for protecting the electric terminal within the channel, the plate being also provided along an edge distant from the cups with a ledge rising above the division walls on the active face of the plate and slanting toward the center portion of the plate.

7. A device for destroying insects having spaced liquid receptacles insulated one from the other with the division wall between the receptacles of a width to permit spanning thereof by the insect to be killed, and means for the connection of the separated receptacles for liquid with a source of electric current to charge liquid within the receptacles to different degrees of electric potential.

In testimony, that I claim the foregoing as my own I have hereto affixed my signature in the presence of two witnesses.

FRANK DONEY.

Witnesses:
CHARLES F. BENSEL,
J. H. LURUTHEN.